United States Patent Office 3,453,531
Patented July 1, 1969

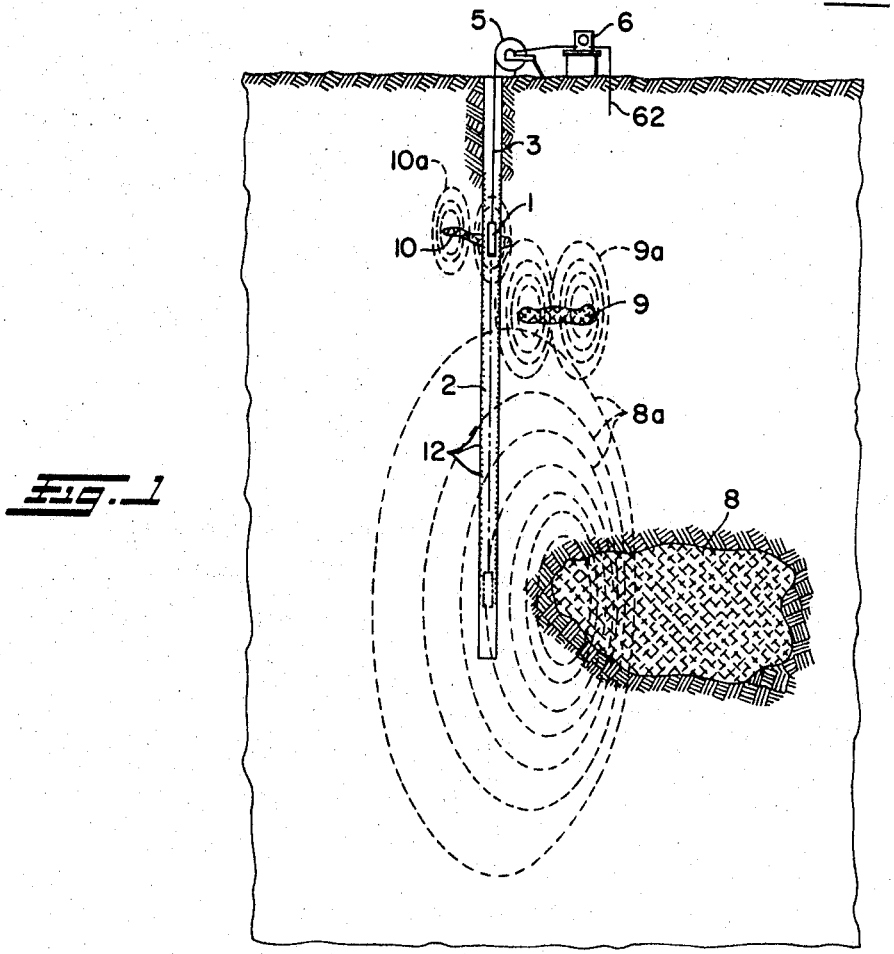
Fig. 1
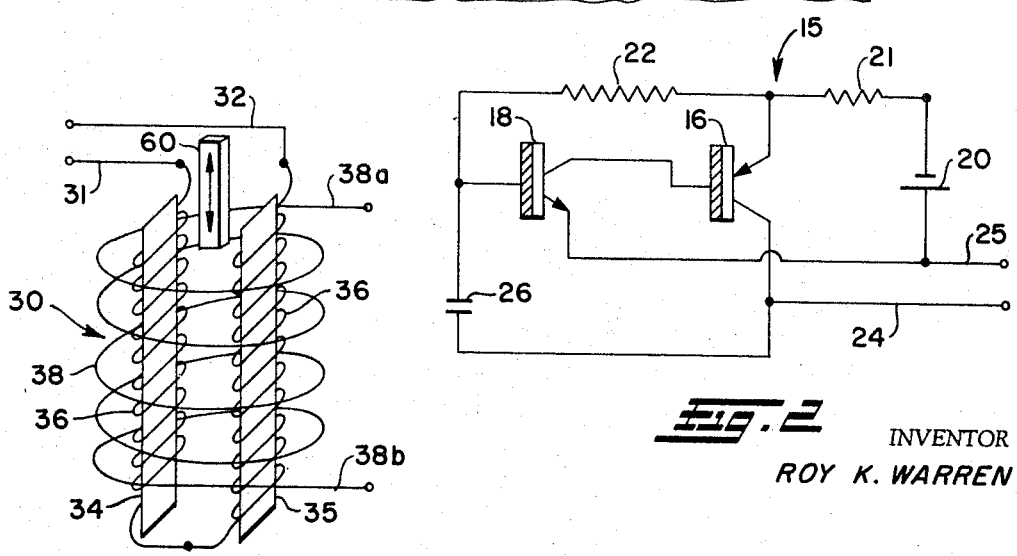
Fig. 2
Fig. 3
INVENTOR
ROY K. WARREN
BY Oberlin, Maky & Donnelly
ATTORNEYS

3,453,531
BORE HOLE MAGNETOMETER WITH CRITICAL SENSITIVITY ADJUSTMENT
Roy K. Warren, Ironton, Mo., assignor to The Hanna Mining Company, Cleveland, Ohio, a corporation of Delaware
Filed Apr. 7, 1966, Ser. No. 540,998
Int. Cl. G01r *33/02;* G01v *3/08*
U.S. Cl. 324—8                                                  3 Claims

ABSTRACT OF THE DISCLOSURE

Apparatus for locating lodes of magnetic ore in a bore hole exploration by measurement of magnetic field strength, including a sensing probe which is supported and traversed through the bore hole by a single conductor wire which also transmits signals to a surface indicating device. The sensing probe consists of a flux gate responsive to intercepted magnetic fields, an oscillator for energizing the flux gate and an adjustable permanent magnet for compensating for the effects of magnetic material located in small veinlets and disseminated in the wall of the bore hole.

---

This invention relates to a bore hole magnetometer for detecting the existence of magnetic ore lodes and more particularly to a specific construction of a magnetometer for detecting ore lodes located a substantial distance from the bore hole test site.

An object of this invention is to provide an improved magnetometer which indicates the presence of remotely located ore bodies through detection of their magnetic fields even though readings are masked by the presence of closely located magnetic materials.

Another object of this invention is to provide a magnetometer whose sensitivity may be varied to most favorably suit the extant conditions of different geologic environments.

A further object of this invention is to provide a magnetometer which is extremely compact and portable wherein all components except the surface indicating instrument and signal wire are contained within the probe which is lowered into the bore hole under test.

Still another object of this invention is to provide a magnetometer which because of its unitary construction need only generate electrical signals to be passed in one direction from the probe to the surface along the length of the support wire thereby increasing the effective range of the device.

Still a further object of this invention is to provide a magnetometer of high portability and reduced complexity wherein only a single wire supports the probe and transmits the electrical signal, utilizing the earth as a return for ground current to the surface.

Other objects and advantages of the present invention will become apparent as the following description proceeds.

To the accomplishment of the foregoing and related ends, the invention then comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

In said annexed drawings:

FIG. 1 is a schematic elevational view showing the magnetometer of the invention in a bore hole and in typical relation to ore bodies and closely located veinlets.

FIG. 2 is the electrical circuit of a preferred oscillator unit for driving the flux gate.

FIG. 3 is a schematic representation of the flux gate of the invention.

Figures 4, 5:
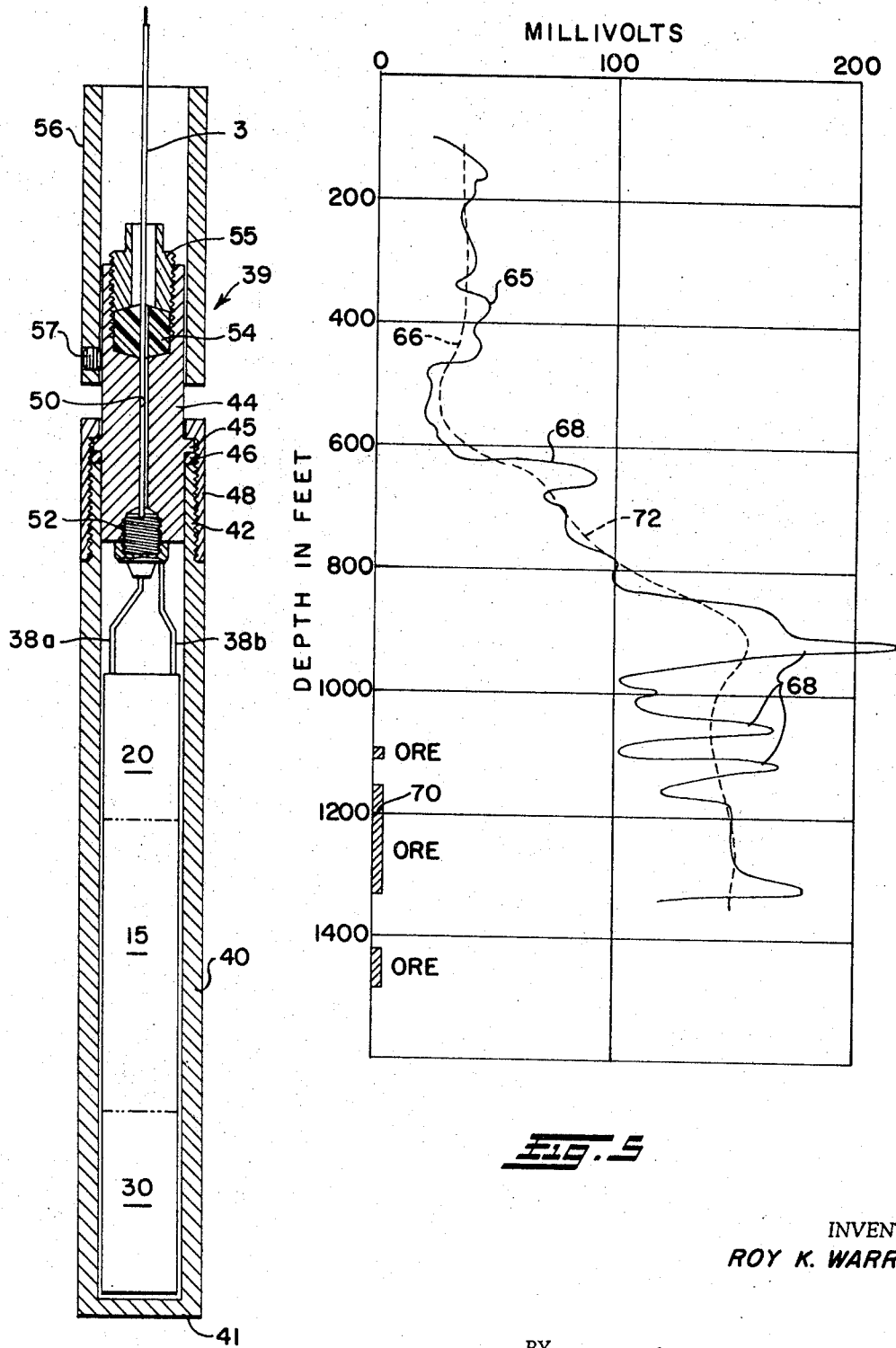
FIG. 4 is a cross-sectional view of the magnetometer probe showing the relation of the assembled parts.
FIG. 5 is a graph of indicator unit millivolt readings versus depth of the probe in feet.

Referring now to FIG. 1, there is shown a magnetometer 1 located in a bore hole 2 in the earth's crust. The magnetometer 1 is supported by a wire 3 emanating from a supply drum 5, the originating end of the wire being connected to the indicator 6 located at the earth's surface at a convenient position for readout by an observer. Also shown in the drawing are a representational ore lode 8 and several magnetic veinlets 9, 10 closely associated to the bore hole 2, descriptive of a typical ore body distribution in the earth's crust.

All of the ore bodies are composed of magnetic material and correspondingly have associated with them magnetic fields represented by dashed lines $8a$–$10a$ in the drawing. The dashed lines $8a$–$10a$ are representative of the effect of the magnetic field of each of the bodies of magnetic material, each dashed ellipse representing a zone of reduced magnetic field intensity located further away from the source of magnetism. Thus, the main lode 8 has associated therewith a relatively strong magnetic field while the veinlets 9, 10 have a rather localized and weaker magnetic field. It can be seen from FIG. 1 that the magnetic fields may be overlapping in certain areas and either reinforcing or diminuting the instananeous magnetic field at any particular point. As the magnetometer 1 is dropped into the bore hole 2 from the surface of the earth, readings are taken of the instantaneous magnetic field at discrete intervals of depth. If readings of magnetic intensity are taken at each point, the magnetometer will indicate similar instantaneous responses when located close to a nearby veinlet or rather distantly from a more massive magnetic lode, and if the magnetometer is highly sensitive, the effects of the localized veinlets will be such as to mask the effects of the distant ore body. It is also clear that if the bore hole wall is liberally sprinkled with disseminated magnetic material 12 a similar masking effect will occur, and no distant effective readings can be obtained.

It has been found that if a critical sensitivity is designed into the magnetometer unit then these purely localized effects can be ignored and readings of a more remote massive ore body can be obtained.

For different geological areas the amount of the localized effect may be different, thus it is important that the magnetometer be designed so that this level of critical sensitivity may be adjusted. For example, it has been found by actual experimentation in one geologic area that if the magnetometer is set to produce an output voltage of 1.0 millivolt for every 2,000 gammas of field intensity change, the larger bodies of magnetic ore can be detected several hundred feet from the magnetometer in spite of the masking effect of the nearby veinlets and disseminated material. As the sensitivity is increased beyond this range, the magnetic effect of the local material increases to such an extent as to mask the larger bodies of ore. As the sensitivity is decreased below this critical value, the anomaly formed by the larger ore body is decreased to a value that makes interpretation difficult.

Because of the interaction of the magnetic fields from the different magnetic bodies, the measurement taken from point to point down the bore hole fluctuates to quite an extent, however the average of these fluctuations is an accurate indication of the presence of a high grade body of ore. Individual intense short duration fluctuations are due to the magnetic veinlets and disseminated magnetic material in the wall of the bore hole.

Referring now to FIG. 2, there is shown the electrical circuit of an oscillator to be used in conjunction with the bore hole magnetometer. A transistorized oscillator circuit is shown as being representational, however other appropriate types of oscillators could be used in association with this invention. The oscillator is completely self-contained and provides an output signal of approximately 1000 cycles per second at a relatively low level of voltage. This signal is then applied to the flux gate 30 which is schematically shown in FIG. 3.

The oscillator 15 of the preferred embodiment consists of a pnp transistor 16 and an npn transistor 18 connected in circuit with a battery 20. A resistor 21 is in the emitter circuit of the transistor 16 and a biasing resistor 22 is connected from the base of transistor 18 to the emitter of transistor 16. A load (not shown in FIG. 2) is connected to lines 24, 25 in series with the collector of transistor 16 and the battery 20. A capacitor 26 couples the change in voltage produced across the load on line 24 to the base of transistor 18, which amplifies the signal and reinforces the change in voltage at the load in an oscillatory manner. The load connected to lines 24, 25 in this embodiment is the primary winding of the flux gate 30 identified by leads 31, 32.

The flux gate 30 consists of two cores 34, 35 comprised of thin sheets of metal of high magnetic permeance which may be a ferronickel alloy, each core being wound in opposite directions with a fine copper wire 36. The cores 34, 35 are in close proximity and are circumscribed by a secondary winding 38 which provides the signal output. The copper wires 36 on the cores 34, 35 are joined together at corresponding ends to form a primary winding with two input leads 31, 32 which are connected to the oscillator signal supply. Thus, a signal applied to the primary winding will drive the cores 34, 35 to saturation and in the absence of an external magnetic field there will be a cancelling effect from the coil on each of the cores 34, 35 so that no voltage in the secondary winding 38 will be produced. When the flux gate 30 is subject to the effect of an external magnetic field, however, the balance of the circuit will be upset and a voltage will be induced in the secondary winding 38, which voltage will be proportional to the strength of the magnetic field according to the flux gate principle of operation which has been well established in the art. The entire flux gate assembly including the self-contained oscillator is enclosed in a long, thin cylindrical brass case, suitably sealed against the entrance of moisture and readily passed into existing bore holes of small dimensions.

Referring now to FIG. 4, there is shown a cross-sectional view of the assembled magnetometer probe 39, showing the relationship of the various components. The flux gate 30, the electronic oscillator 15 and the battery power source 20 are positioned within a cylindrical brass case 40 which is brazed closed at the bottom 41 thereof and threaded for coupling at its upper portion 42. A body member 44 with a flange 45 near its mid-portion and a resilient ring seal 46 below the flange 45 is slidably positioned within the upper portion 42 of the case 40, with the resilient seal 46 bearing against the upper end of the case 40 to provide a fluid seal. An internally threaded sleeve member 48 secures the body portion 44 in the case 40 by clamping the flange 45 and the resilient seal 46 against the top of the case 40. A hole 50 drilled along the axis of the body 44 has enlarged threaded openings at both the lower and upper ends, and a microphone connector 52 is retained at the lower end for coupling with the electrical components located within the case 40. The support and signal carrying wire 3 which is an insulated single conductor wire is affixed to the center contact of the microphone connector 52 and passes through the axial hole 50 of the body 44 to the supply reel 5 located at the surface of the earth. A rubber plug 54 is positioned within the enlarged bore at the top of the body 44 and is compressed by a hex-head hollow threaded plug 55, which forces the rubber plug 54 both against the body 44 and also against the signal wire 3 to provide a water tight seal. An outside case 56 of cylindrical configuration provides protection for the signal wire and the compressing plug and is affixed to the upper portion of the body 44 by three set screws 57.

The probe 39 in one embodiment has a diameter of approximately 1.5 inches and an overall length of approximately 17 inches, thus providing a highly compact configuration which is suitable for use in many of the existing standard bore hole test sites. The case 40, body 44, sleeve 48, and outside case 56 of the probe 39 are of electrically conductive material while the case 40 is of a non-magnetic material so as not to disrupt the magnetic field being intercepted by the flux gate 30 contained therein. One lead 38a from the flux gate secondary winding 38 is joined to the center insulated portion of the microphone connector 52, while the second lead 38b is joined to the outside ferrule of the microphone connector 52 which is threaded onto the mating portion located in the lower bore of the body 44. Thus the signal lead 38a from the flux gate is attached to the signal and support wire 3 while the second lead 38b is attached to the body 44 and thus the case 40 of the probe assembly 39. When the probe 39 is lowered into a bore hole under test the outside of the case 40 comes into contact with the wall of the bore hole to provide an earth ground connection for the signal from the flux gate 30. Accordingly, the indicator 6 has one lead connected to the earth current by means of a rod 62 driven into the ground. Such an electrical arrangement provides a minimum impedance and therefore a maximum flow of current from the magnetometer to the indicator 6. Therefore, the small oscillator 15 within the probe is the equivalent of a larger more complicated oscillator located at the surface of the earth which must transmit a signal down to the probe and then back again to the indicator 6.

The response of the flux gate 30 may be adjusted by the presence of a small permanent magnet 60, adjustably mounted in proximity to the primary and secondary windings so that the magnetic field of the magnet 60 links the windings of the flux gate 30. The effect of the permanent magnetic field will be to oppose the effect of the external magnetic field, thereby changing the voltage output of the flux gate 30, allowing measurements to be recorded on a more or less sensitive scale of the indicator 6. Adjustments in the response are made by changing the coupling of the permanent magnetic field with the windings, as by moving the permanent magnet 60 further from, or closer to, the flux gate 30, in the direction of the arrows in FIG. 3. This adjustment is necessary in order to operate the magnetometer under optimum conditions in different environments.

The sensitivity of the flux gate 30 is dependent upon the permeance of the cores 34, 35 and the output of the oscillator 15, and adjustment of sensitivity for a particular test site may be accomplished by using different flux gates or adjusting the output of the oscillator 15.

Thus it can be seen that the magnetometer may be used in an optimum mode by adjusting both the response for local field conditions and the sensitivity for discriminating between proximate and remote effects.

It is evident that if the bore hole 2 is clean of material showing magnetic effect, that is, if it is in an environment made up of primarily igneous or sedimentary rock, there will be few difficulties encountered in locating a remote ore body. The reading of the indicating meter 6 should increase fairly smoothly as the ore body is approached.

This invention is particularly applicable under conditions wherein numerous veinlets or disseminated magnetic materials are fairly abundant near the bore hole. By setting the sensitivity of the magnetometer to a critical value these local low intensity readings can be largely ignored and only the overall buildup of magnetic field intensity due to the magnetic field of large ore bodies will be recorded. Thus it can be seen that it is important to have a unit with the ability to respond to wide variations of magnetic field intensity, so that a lower band of intensity may be ignored while still responding to, and showing variations in, high levels of intensity, or in a different locale, responding to the complete range of magnetic field variation.

Referring now to FIG. 5, there is shown a graph of an actual bore hole magnetometer survey with signal level readings in millivolts at the indicator 6 plotted against the depth of a probe 1 as it is dropped into a bore hole. The continuous curve 65 is the actual reading of the indicator 6 while the dashed curve 66 is an average of the continuous curve 65 plotted after the continuous curve has been recorded. The continuous curve 65 is subject to intense fluctuations 68 which are due to small magnetic veinlets or disseminated magnetic material located at or near the wall of the bore hole. However, the continuous curve 65 does show an overall buildup of voltage as the main ore body is approached and it is this buildup which the dashed curve 66 describes.

In this particular survey the main ore lode is located at about the 1200 foot depth and the dashed average curve 66 gives an indication of the presence of this lode by the start of a buildup in magnitude of readings in the 600 to 800 foot depth range producing a slope 72. Had the survey been stopped in this 600 to 800 foot range, an indication of the approach of a larger body of ore 70 would have been registered. The continuation of the readings to the maximum depth only verifies this conclusion. The actual millivolt readings of the indicator 6 are not significant and the slope 72 of the dashed curve 66 could have occurred at a deeper or shallower depth for different sensitivity settings of the flux gate 30. The actual setting of the sensitivity of the instrument is determined by the conditions of the particular location being surveyed, to reduce the intense fluctuations 68 shown in the continuous curve while still being sensitive enough to record a strong magnetic field at a substantial distance.

As seen in FIG. 5, had the fluctuations 68 of the continuous curve 65 been much greater, it would have been difficult to chart an average reading to give an indication of an overall buildup of intensity. The sensitivity of the flux gate 30 could be correlated to intensity of intercepted magnetic field so that the distance to a particular ore body could be estimated, but this is a refinement which although possible, is not necessary in this invention, since only the recognition of the presence of such a lode is important. It is also not critical to this invention whether the curve is plotted on a continuous chart recorder as the probe is dropped into the bore hole or recorded as a multiplicity of instantaneous readings and plotted to obtain a record or even if a skilled operator only observes the indicator readings to recognize a buildup of readings.

It can also be seen that the longer the bore hole, the more effective and accurate the results of this system of measurements will be. If a large ore body is passed by the probe in its downward descent, a general buildup and falling off of readings will ensue. A more closely located smaller body of ore will show a more rapid rise and similarly more rapid falling off of readings. Finally, small veinlets and disseminated magnetic particles located right at the bore hole will provide a very intense rise and decay of readings. It is important that the size of the ore body as well as its distance from the bore hole be taken into account. Often, in a bore hole sample it can be determined whether or not disseminated magnetic particles have been encountered and if such be the case, the sensitivity of the meter may be adjusted immediately to compensate for the effects of these minor bodies.

It is evident that if the ore body is located in a direction below the bore hole the meter will indicate levels of generally increasing intensity but never reaching a peak. Although there may be some anomaly between sizes of ore bodies and distance below the bore hole, it is evident that the instrument has effectively increased the length of the bore hole by indicating the presence of the magnetic lode.

It is also practical to use the magnetometer of the invention as a hand held instrument for detecting the presence of buried lodes as, for instance, in mines and the like. The extreme portability of the unit makes it convenient to hand carry this instrument and make these measurements feasible. The critical sensitivity setting is also important in these measurements in that magnetic material in the surface areas of the mine may be compensated for in detecting buried or remote bodies of ore. In this use, the only alteration that need be made is to provide a dual length of wire for carrying the secondary output voltage from the probe to the recording instrument, inasmuch as it is impractical in this instance to utilize an earth ground return connection.

Other modes of applying the principle of the invention may be employed, change being made as regards the details described, provided the features stated in any of the following claims or the equivalent of such be employed.

I, therefore, particularly point out and distinctly claim as my invention:

1. Bore hole magnetometer apparatus for exploration of the magnetic fields of ore lodes comprising, a housing of generally cylindrical configuration adapted for transit in a bore hole, said housing being of a non-magnetic and electrically conductive material, a flux gate sensing element located within said housing, said element comprising a pair of cores of highly permeable material having primary and secondary windings thereon, the primary windings encircling each core of said pair of cores and secondary winding jointly encircling both cores, an energizing source located within said housing, said source comprising a transistorized oscillator and a battery for energization thereof, the output of said oscillator being connected to the primary winding of said sensing element for inducing an output voltage into the secondary winding as a function of the intensity of the magnetic field intercepted by said sensing element, a single wire having an insulation jacket for transmitting the output voltage of said sensing element and for supporting said housing during transit, said wire being connected at one end to one lead of the secondary winding and the insulation jacket being connected to said housing in sealing engagement for support thereof, the other end of the secondary winding being electrically connected to said housing, indicator means located at the surface entrance of the bore hole, said indicator means being electrically responsive and having a ground connection to earth and a direct connection to the other end of said wire, and a permanent magnet mounted within said housing in operative relation to said sensing element for effecting a magnetic field in partial opposition to magnetic fields external of said housing, thereby to provide a discrimination between remote and adjacent ore bodies.

2. Magnetometer apparatus as set forth in claim 1 wherein said permanent magnet is adjustably mounted in said housing for varying the magnetic field coupled to said sensing element.

3. Magnetometer apparatus as set forth in claim 2 wherein the permeable material of said cores and the coupling of the primary and secondary windings is selected to provide a sensitivity of approximately 2000 gammas per millivolt for said flux gate sensing element.

References Cited

UNITED STATES PATENTS

| | | | |
|---|---|---|---|
| 2,018,080 | 10/1935 | Martienssen | 324—5 |
| 3,191,118 | 6/1965 | Jung et al. | 324—43 XR |
| 2,406,870 | 9/1946 | Vacquier | 324—8 XR |
| 2,599,687 | 6/1952 | Brant | 324—8 |
| 2,741,757 | 4/1956 | Devol et al. | 324—43 XR |
| 2,766,426 | 10/1956 | Wilhelm | 324—8 XR |

RUDOLPH V. ROLINEC, *Primary Examiner.*

G. R. STRECKER, *Assistant Examiner.*

U.S. Cl. X.R.

324—43